US011947581B2

(12) United States Patent
G Rao et al.

(10) Patent No.: US 11,947,581 B2
(45) Date of Patent: Apr. 2, 2024

(54) DYNAMIC TAXONOMY BUILDER AND SMART FEED COMPILER

(71) Applicant: ACCENTURE GLOBAL SOLUTIONS LIMITED, Dublin (IE)

(72) Inventors: Srikanth G Rao, Bangalore (IN); Tarun Singhal, Bangalore (IN); Mathangi Sandilya, Bangalore (IN); Issac Abraham Alummoottil, Thiruvalla (IN); Raja Sekhar Velagapudi, Chennai (IN); Rahel James Kale, Pune (IN); Ankur Garg, Gurgaon (IN); Jayaprakash Nooji Shekar, Bangalore (IN); Omkar Sudhakar Deorukhkar, Bangalore (IN); Veera Raghavan Valayaputhur, Thane (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 228 days.

(21) Appl. No.: 17/323,476

(22) Filed: May 18, 2021

(65) Prior Publication Data
US 2022/0374482 A1 Nov. 24, 2022

(51) Int. Cl.
*G06F 16/35* (2019.01)
(52) U.S. Cl.
CPC .................. *G06F 16/35* (2019.01)
(58) Field of Classification Search
CPC .... G06F 16/35; G06F 16/9535; G06F 16/958; H04L 51/52; H04L 67/00; G06Q 50/01
See application file for complete search history.

(56) References Cited

U.S. PATENT DOCUMENTS

| 8,949,535 | B1* | 2/2015 | Hunter | G06F 11/073 |
| | | | | 711/119 |
| 10,248,533 | B1* | 4/2019 | Shah | G06F 11/3006 |
| 2012/0317370 | A1* | 12/2012 | Luna | H04L 67/5682 |
| | | | | 711/146 |
| 2014/0006406 | A1* | 1/2014 | Kafati | G06F 16/355 |
| | | | | 707/738 |
| 2015/0100537 | A1* | 4/2015 | Grieves | G06F 40/274 |
| | | | | 706/52 |
| 2015/0169583 | A1* | 6/2015 | O'Neil | G06F 16/316 |
| | | | | 707/748 |
| 2016/0231372 | A1* | 8/2016 | Wootton | H04L 12/2809 |
| 2017/0195451 | A1* | 7/2017 | Backholm | H04L 67/306 |

(Continued)

*Primary Examiner* — Albert M Phillips, III
*Assistant Examiner* — Fatima P Mina
(74) *Attorney, Agent, or Firm* — Mannava & Kang, P.C.

(57) ABSTRACT

A plurality of personalized news feeds are generated from input feeds including digital content items based on a dynamic taxonomy data structure. Entities are extracted from the input feeds and relationship strengths are obtained for the extracted entities and the digital content items. The dynamic taxonomy data structure is updated with the extracted entities and entries for the digital content news items are included at the corresponding branches based on the relationship strengths. Attributes are obtained for the entities and those entities corresponding to the trending topics are identified. Personalized news feeds are generated including the digital content items listed under the entities. Digital content items are added or removed from the digital content feeds based on one or more entity attributes.

20 Claims, 11 Drawing Sheets

(56) References Cited

U.S. PATENT DOCUMENTS

| | | |
|---|---|---|
| 2018/0293515 A1* | 10/2018 | Prokopenya .............. G09B 5/02 |
| 2020/0084519 A1* | 3/2020 | Pappu ................. H04N 21/8405 |
| 2021/0110432 A1* | 4/2021 | Chen ................... G06F 16/9536 |
| 2021/0201169 A1* | 7/2021 | Fung Moo .......... G10L 15/1822 |
| 2022/0164520 A1* | 5/2022 | Dolan ..................... G06F 40/18 |

* cited by examiner

DYNAMIC TAXONOMY BUILDER AND SMART FEED COMPILER

BACKGROUND

Consumers are spending more time on mobile devices, and spending more of said time on fewer platforms, where messaging, live streaming, podcasting, and other emerging mediums are principal to how content is discovered and consumed. In most cases, more than 90% of consumption on new-age digital platforms is through mobile devices. While content remains king even today, it has become imperative to deliver this content in a format that is engaging and interesting to the end-user. Various platforms have emerged to keep consumers abreast of the happenings in the world in real-time. However, traditional media platforms fail to engage with new-age consumers in a format that is relevant and of interest to them.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
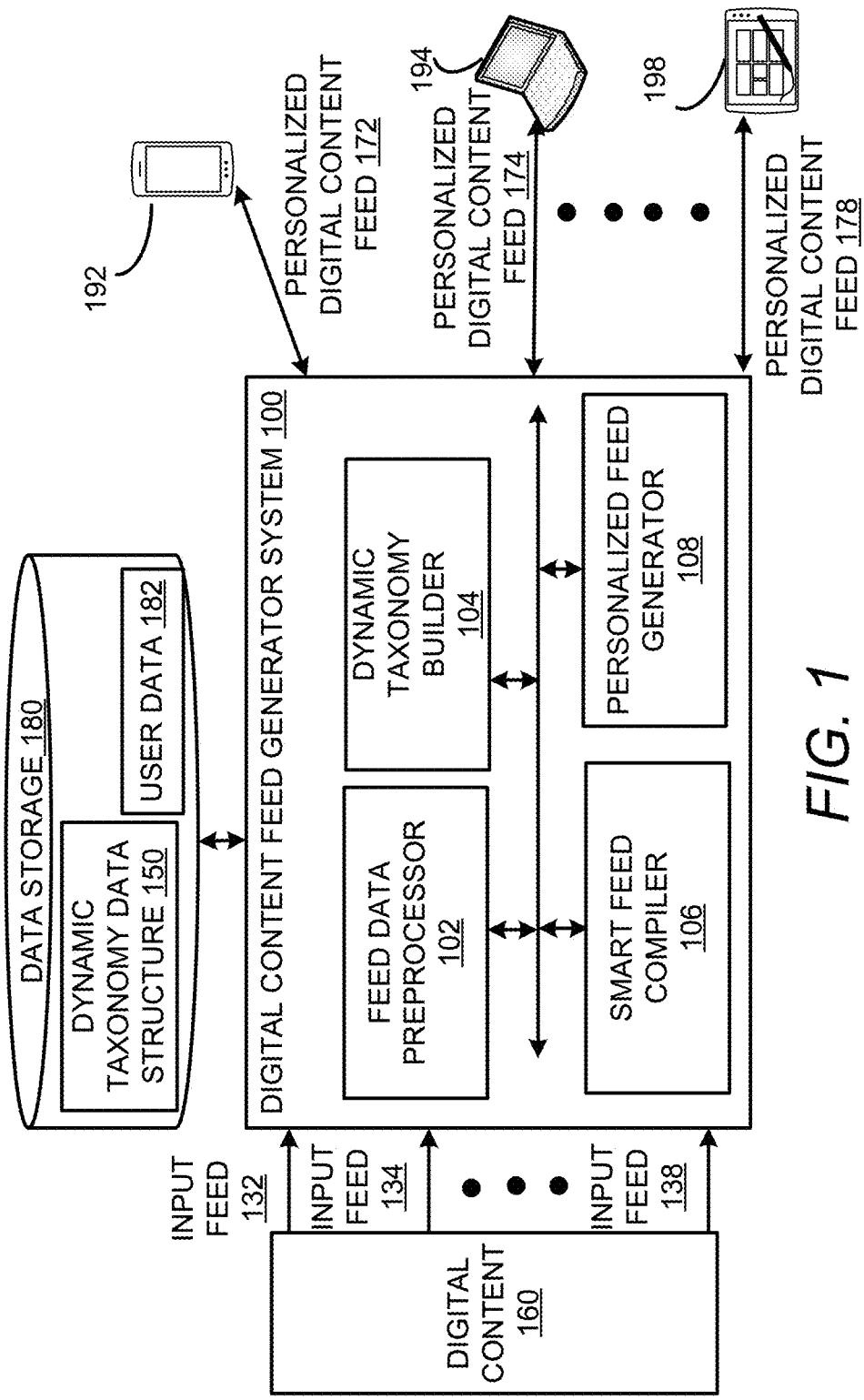
FIG. 1 shows a block diagram of a digital content feed generator system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A digital content feed generator system that receives input feeds from data sources and generates personalized digital content feeds to users by employing a dynamic taxonomy data structure is disclosed. The plurality of input feeds includes digital content items such as news articles from various sources in textual, audio or image formats. Entities or keywords that represent or uniquely identify the content (e.g., news) in the digital content item are extracted from the input feeds. Furthermore, relationship strengths between the entities and the digital content items are determined. In an example, the relationship strength can be defined between one entity and another entity as the expression of number of times the entities occurred together in a digital content item. Similarly, the relationship strength between an entity and the corresponding digital content item can be defined as the expression of number of occurrences of the entity within the digital content item. In an example, a separate schema can be maintained for storing the relationship strengths of each of the entity connections. Based on the relationship strengths, the entities may be divided as the topic entity and subtopic entities so that an entity with the highest relationship strength as compared to other entities, is selected as the topic entity, while other entities may be considered as subtopic entities. Furthermore, the relationship strengths enable determining the context associated with the occurrence of an entity in a digital content item.

The digital content feed generator system also determines if the entities are included in the dynamic taxonomy data structure. If the entities are already stored, then the dynamic taxonomy data structure is updated with the entries for the digital content items at the appropriate branches based on a hierarchy defined by the topic entity and the subtopic entities. If it is determined that at least one of the entities is not included in the dynamic taxonomy data structure, then a parent node corresponding to the new entity is generated within the dynamic taxonomy data structure and other entities that occur with the new entity may be added hierarchically as child nodes corresponding to subtopics under the parent node. An entry for each of the digital content items corresponding to the new entity can be stored based on the hierarchy as determined by the relationship strengths between the new entity and each of the digital content items. Besides adding the entities to the dynamic taxonomy data structure, the system also obtains entity attributes which include time to live (TTL), count, base weightage, and average frequency of occurrence (AFOO) for a predetermined number of hours. Three secondary attributes may also be determined which can include linked digital content item IDs, synonyms, or other editorial-driven attribute placeholders.

On processing the entities for storage to the dynamic taxonomy data structure, the system generates entity vector representations which are further clustered by topics. The top trending entities that are included in at least X number of digital content items (wherein X is a natural number and X=1, 2, ...) issued in an immediately preceding, predefined time period are identified from each cluster. The digital content items that are not associated with the top trending entities for a predetermined prior time period (e.g., below a minimum threshold of AFOO value), are discarded from further processing. This enables the system to delete or detach entries to stale content. A digital content item feed can be generated from the clusters wherein different digital content items associated with a specific topic can be grouped under an automatically generated title. Different clusters can give rise to different groups of digital content items. Furthermore, historical digital content items or news articles that may be of interest to the user can be added to each of the groups. The digital content item feeds can be further personalized to specific users, based on user preference data. The personalized digital content feeds are transmitted to corresponding user communication devices.

The system provides a technical solution to the technical problem of how live feeds, live data, broadcast feeds, news programs and other assets can be disaggregated and reassembled into new digital content feeds that are updated in real-time to not only include the latest content or news but also to remove content which was already viewed by the users. This is made possible due to the dynamically updateable nature of the dynamic taxonomy data structure which can incorporate not only the newly received digital content items, but also automatically incorporate new entities received within the digital content items. For example, live taxonomy data structures can be used to update users regarding sports and news content. The estimation of relationship strengths further enables the system to determine the hierarchy of entities associated with each digital content item as it is received so that an entry for the digital content item can be made at the appropriate branch which represents the entity hierarchy. Furthermore, the concept of the relationship strengths enables determining a context of an entity so that if the status of the entity is updated, then the relationship strength of the entity with the updated status improves providing an accurate context that enables selecting the appropriate digital content items to generate personalized feeds that include content, which is presented more accurately based on the derived context.

FIG. 1 shows a block diagram of a digital content feed generator system 100 in accordance with the examples disclosed herein. The digital content feed generator system 100 receives input feeds 132, 134, . . . , 138, that include digital content 160 pertaining to news from various sources such as but not limited to, websites, social media platforms such as Facebook® and Twitter®, Really Simple Syndication (RSS) feeds, etc., extracts entities from each of the digital content items, stores the entities along with the entries of the corresponding digital content items in a dynamic taxonomy data structure 150. The contents of the dynamic taxonomy data structure 150 are further processed to generate personalized digital content feeds 172, 174, . . . , 178, for users of the digital content feed generator system 100. The personalized digital content feeds 172, 174, . . . , 178, can be provided to the user communication devices 192, 194, . . . , 198, registered by the users with the digital content feed generator system 100.

The digital content feed generator system 100 includes a feed data preprocessor 102, a dynamic taxonomy builder 104, a smart feed compiler 106, and a personalized feed generator 108. The feed data preprocessor 102 accesses the digital content 160 received in the various input feeds 132, 134, . . . , 138, to execute, preprocessing steps, such as parsing, tokenization, data cleansing including the deduplication, lemmatization, etc. to obtain individual words from each of the digital content 160. The digital content 160 can include items with textual data only or may include digital content items with images, video, audio data. The images received may be analyzed using image processing techniques for textual data extraction while the feed data preprocessor 102 can extract textual data from the audio, video, digital content items by using different transcription tools to convert the voice data, therein into textual data. The textual data is then parsed, cleansed, tokenized, and otherwise prepared for entity extraction.

The preprocessed data is provided to the dynamic taxonomy builder 104 which extracts entities from the preprocessed data. The dynamic taxonomy builder 104 builds the dynamic taxonomy data structure 150 e.g., a knowledge graph, by further deriving and mapping the relationships between the entities. The dynamic taxonomy builder 104 also calculates and represents the strengths of the relationship between the entities in the dynamic taxonomy data structure 150. In an example, incorporating the relationship strengths into the dynamic taxonomy data structure 150 enables identifying certain characteristic attributes in domains such as the news domain wherein the context of the news plays a rather vital role. Context is derived from the relationship strength so that information that is not explicitly stated in a digital content item can still be derived from the dynamic taxonomy data structure 150 based on relationship strengths. For example, an entity "John Doe" can be strongly associated with another entity "President" in the dynamic taxonomy data structure 150. Therefore, if a digital content item related to John Doe is later received without an explicit mention of John Doe being the President, the relationship strength recorded in the dynamic taxonomy data structure 150 automatically provides the hidden context regarding President John Doe to the subsequent digital content item.

The dynamic taxonomy data structure 150 representing a temporal hierarchical structure of the entities is also configured to represent a primary entity which may be the main topic of an article and the secondary entities which may form the subtopics of the article. The dynamic taxonomy data structure 150 is a flexible data structure configured to accommodate the changes in the relative importance of various entities occurring in articles over time. Therefore, a secondary entity at a given time may gain importance as a primary entity at a later time. New entities occurring in news articles are added while entities that are out of date or obsolete can be deleted. For example, entities that have not occurred in at least a predefined threshold number of articles within a predefined time threshold can be deleted. Various numerical factors are used as described herein for determining the temporal attributes of the entities. In the context of news feeds, the temporal attributes of the entities and the relationships there between enable processing the recency aspect of the news so that breaking news is forwarded to the users in the personalized digital content feeds. The dynamic taxonomy builder 104 further includes entries for the digital content 160 under the branch of the corresponding primary entity/secondary entities in the dynamic taxonomy data structure 150. In an example, an initial set of entities can be included in the taxonomy manually by an editorial team which provides an initial pool of entities. This works similar to pre-training a system to jump-start it. An additional element of the dynamic taxonomy data structure 150 is the inclusion of "Add-on entities". A digital content item e.g., a news article can include other attributes that can be exploited to enrich the dynamic taxonomy data structure 150. An "Add-on entities" table can contain rules which when met enable Add on entity associations with the digital content items. One example of add-on entities can include an association of sentiments with specific digital content items using Natural Language Processing (NLP).

The smart feed compiler 106 accesses the dynamic taxonomy data structure 150 to assemble digital content streams or feeds for users of the digital content feed generator system 100. The smart feed compiler 106 generates digital content feeds, having a set of grouped digital content items e.g., news articles. Grouping of digital content items involves clustering of related items based on Artificial Intelligence (AI) driven entity identification. For example, a news feed generated by the smart feed compiler 106 can include contextually grouped news articles as well as randomly inserted historical newsfeeds which refresh the users' memory thereby improving user experience. Historic news articles can be identified with help of the dynamic taxonomy data structure 150. Once an article is associated with a taxonomy branch having the highest relationship strength, other articles linked to that branch become valid nominees for inclusion as historical articles within a news feed. Any related historical article from that taxonomy branch can be randomly picked for the news feed. The smart feed compiler 106 can be configured to generate new digital content feeds each time one of the input feeds 132, 134, . . . , 138, is updated with new digital content or the smart feed compiler 106 can be configured to generate new digital content feeds periodically to include new digital content that is received in the input feeds 132, 134, . . . , 138, since the last update of the personalized digital content feeds 172, 174, . . . , 178.

The personalized digital content feed generator 108 can access user data 182 stored in a data store 180 communicatively coupled to the digital content feed generator system 100 to configure the digital content feeds from the smart feed compiler 106 to generate the personalized digital content feeds 172, 174, . . . , 178, which are transmitted to user communication devices. User preferences such as the IDs of the user communication devices to receive the personalized digital content feeds 172, 174, . . . , 178, preferences for specific digital content sources, format preferences e.g., whether or not to include images/graphics, etc., are applied to customize the feeds from the smart feed compiler to generate the personalized digital content feeds 172, 174, . . . , 178, which are transmitted to the corresponding user communication devices 192, 194, . . . , 198.

Figure 2:
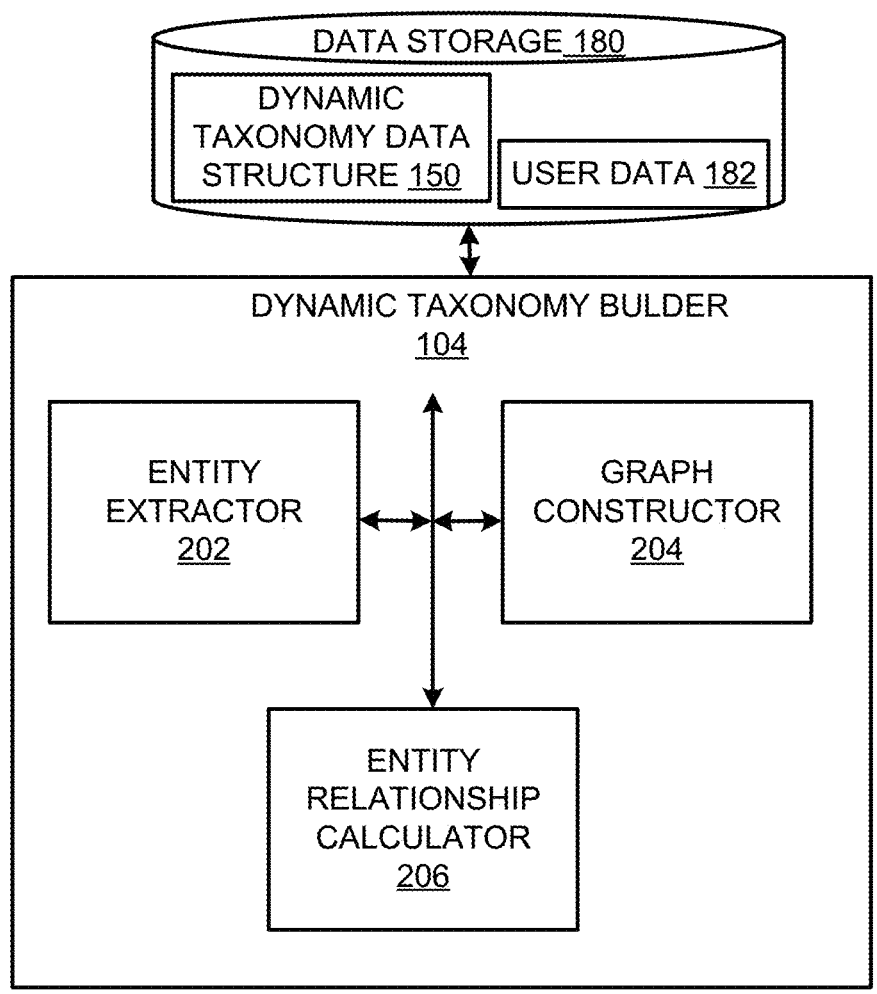
FIG. 2 shows a block diagram of a dynamic taxonomy builder in accordance with the examples disclosed herein.

FIG. 2 shows a block diagram of the dynamic taxonomy builder 104 in accordance with the examples disclosed herein. The dynamic taxonomy builder 104 includes an entity extractor 202, a graph constructor 204, and an entity relationship calculator 206. The entity extractor 202 can employ NLP techniques such as named entity recognition (NER), etc., to identify entities from a digital content item received in one of the input feeds 132, 134, . . . , 138. In an example, specific machine learning (ML) models such as classifiers can be trained to extract different types of entities. The extracted entities can be further processed for handling entity null values, converting entities to lower case, de-duplicating entities, and ordering the entities in ascending or descending alphabetical orders, etc. In an example, the entity extractor 202 can also be configured to group entities so that the same entities in different forms (e.g., U.S.A, U.S., or United States) are identified as the same entity.

The graph constructor 204 determines if the entities are already included in the dynamic taxonomy data structure 150 using NLP techniques such as word similarity, etc. If any of the entities are not in the dynamic taxonomy data structure 150, new branches with different combinations of the missing entities along with the related entities as the main topics versus sub-topics are added to the dynamic taxonomy data structure 150. If an entity is already included in the dynamic taxonomy data structure 150, then an entry for the digital content item can be included at the corresponding branch or branches based on the determined entity hierarchy which in turn depends on the relevance of the entity to the digital content item. Therefore, if an entity is the main topic of the digital content item, then the entry for the digital content item can be included at the branch where the entity is at the top of the hierarchy i.e., the parent node. However, if the entity is not the main topic but a sub-topic in the digital content item, then the entry for the digital content item can be included in the sub-topic branch of a main topic entity branch. Again, if either the main topic branch or the sub-topic branch of the main topic branch is not found, then such branches are generated within the dynamic taxonomy data structure 150, and an entry for the digital content item is included therein.

The entity relationship calculator 206 obtains the strength of the relationships between different entities. The strength of the relationship between two entities can be determined based on the number of times the entities occur together in a digital content item. The greater the number of co-occurrences, the higher will be the relationship strength between the entities. The relationship strength between two entities depends on entity attributes such as but not limited to, count, AFOO, TTL, etc. The count attribute includes the number of digital content items e.g., news items that are issued in a preceding specific period (e.g., previous X days wherein X is a natural number and X=1, 2, 3 . . . ) wherein the entities occurred together. The inclusion of time limits on the count attribute enables the digital content feed generator system 100 against biasing towards news trends that were popular a long time ago (e.g., many years ago). AFOO is a system-calculated value. Hence it dynamically changes based on the digital content items that keep coming in. AFOO will automatically go down when there is no news related to that particular entity for a certain duration, and may eventually go towards 0. Hence, a news item is subtly or gradually removed from the personalized data content feeds, as opposed to being immediately removed. So, a news item slowly descends in the order of data content items in the digital content feeds 172, . . . , 178 as newer digital content items are received. TTL can be calculated based on the AFOO. In an example, the digital content feed generator system 100 may set default values for the count, AFOO, TTL, attributes for new entities added to the dynamic taxonomy data structure 150.

Figure 3:
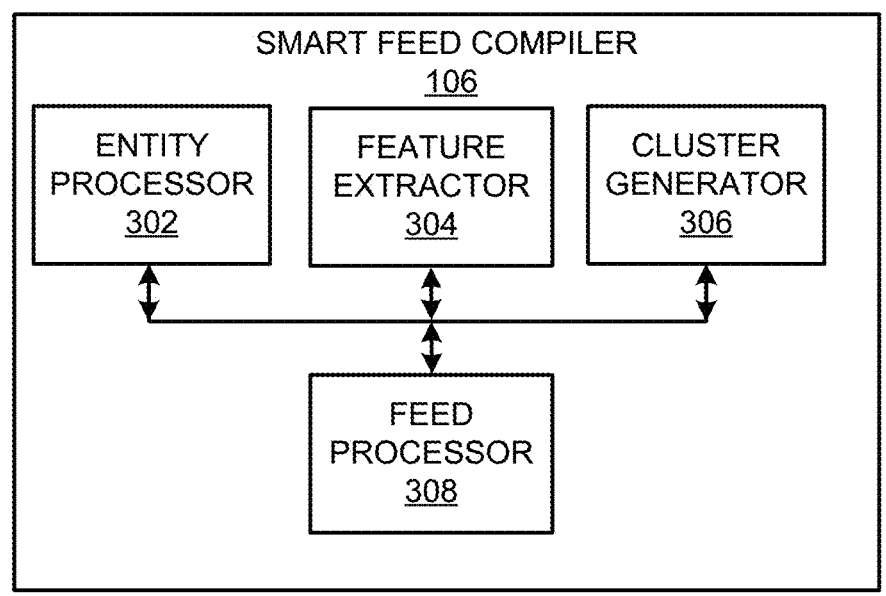
FIG. 3 shows a block diagram of a smart feed compiler in accordance with the examples disclosed herein.

FIG. 3 shows a block diagram of the smart feed compiler 106 in accordance with the examples disclosed herein. The smart feed compiler 106 includes an entity processor 302, a feature extractor 304, a cluster generator 306, and a feed processor 308. The entity processor 302 accesses the dynamic taxonomy data structure 150 to identify newly added digital content items along with the corresponding entities. Additionally, entity attributes such as the count, AFOO, TTL, etc., and entity metadata such as geography and time metadata (i.e., the time of issuance of the digital content item including the entities) are also accessed. In an example, the entity processor 302 can collect digital content periodically (e.g., every 72 hours) for generating the digital content streams.

The feature extractor 304 creates features from entities using term frequency-inverse document frequency (TF-IDF), using n-grams (e.g., bigrams), etc. The feature extractor 304 can ignore entities that are infrequently used. The feature extractor 304 generates vectorized representations of the entities in the semantic space. The cluster generator 306 accesses the vectorized representations of the entities, to cluster entities by topics identified from the digital content 160. In an example, the cluster generator 306 can use the K-means clustering algorithm for generating topic clusters of the entities. In an example, the number of clusters that are generated can be optimized using the elbow method. The optimal number of clusters are further processed for contextual level cluster refinement to identify top trending entities and their semantic equivalents in each of the clusters. The semantic equivalents of the top trending entities can be identified using NLP techniques such as word embeddings and similarity matching. Referring to the news domain as an example, identifying breaking news can be challenging as copious news articles are published each day. While multiple factors such as editorial decisions, topic importance, people involved, etc., can be used, the key factor that identifies a piece of news as breaking news is the sudden barrage of news articles related to the same topic that are received by the digital content feed generator system 100 within a short time e.g., a few hours. Such sudden skewing of digital content to specific entities or keywords are signals detected by the digital content feed generator system 100 to identify breaking news. As the TTL and the weightage attributes are driven by the frequency of occurrence i.e., the AFOO, they get directly influenced by the incoming news flow.

In addition to identifying breaking news, the digital content feed generator system 100 is also configured to remove stale or obsolete content that is no longer relevant or has long been viewed by the users. In an example, digital content items having a zero value for the AFOO attribute can be identified as stale content. Accordingly, the entities that do not form the top N (N being a natural number and N=1, 2, 3, . . . ) entities are also disregarded by the cluster generator 306 in the cluster formation. The feed processor 308 generates the digital content item feeds to include the digital content items pertaining to the top-trending entities in the clusters. The feed processor 308 also adds historical digital content items to the digital content item feeds and identifies a topic name or even dynamically generates a headline for the digital content feeds which are further refined per the user data 182 of individual users by the personalized feed generator 108 to generate the personalized digital content feeds 172, 174, . . . , 178, which are transmitted to corresponding user communication devices 192, 194, . . . 198.

Figure 4:
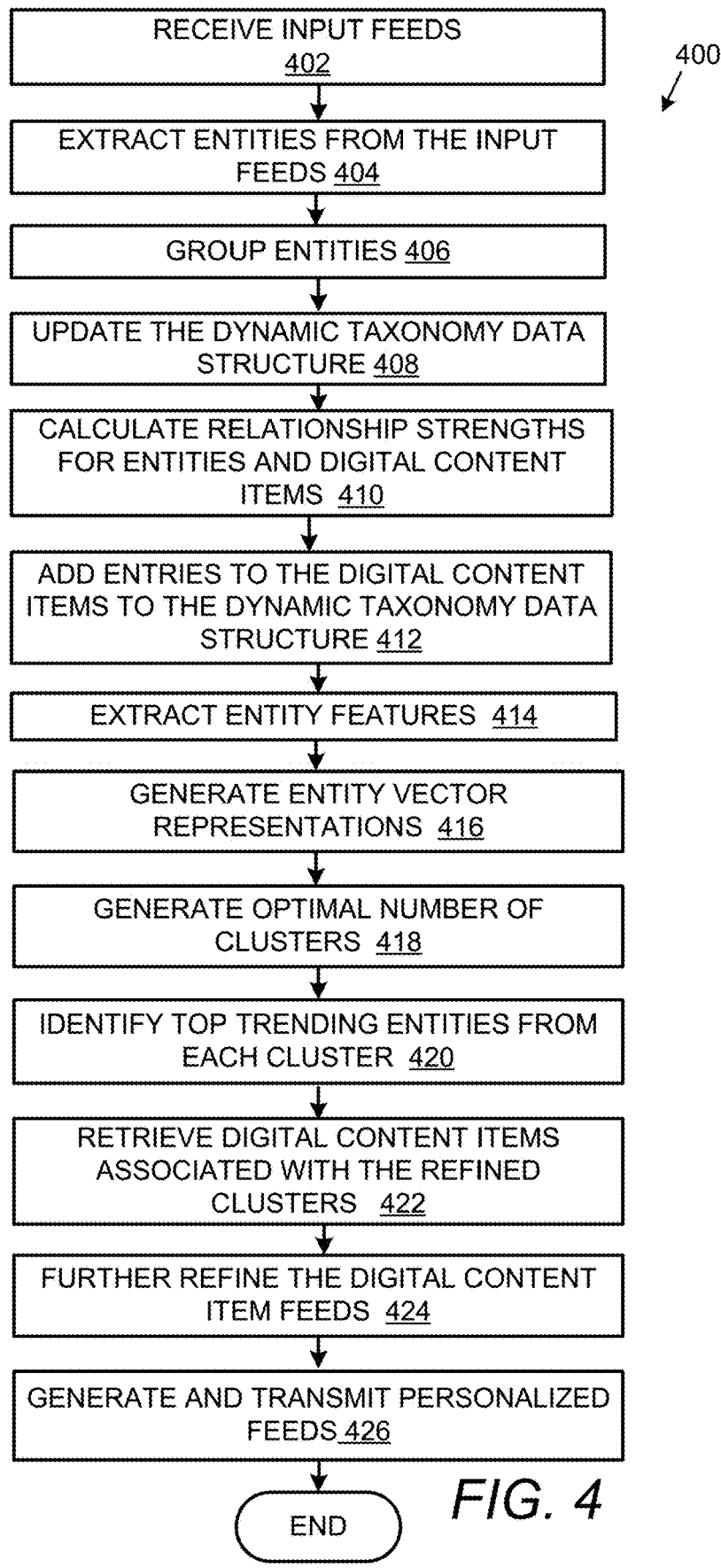
FIG. 4 shows a flowchart that details a method of generating personalized digital content feeds in accordance with the examples disclosed herein.

FIG. 4 shows a flowchart 400 that details a method of generating personalized digital in accordance with the examples disclosed herein. The method begins at 402 wherein the input feeds 132, 134, . . . , 138, including the digital content 160 are received from different data sources. The digital content 160 can include digital content items with entities related to a topic (e.g., news) to be conveyed to users. At 404, the entities are extracted from the digital content items received in the input feeds 132, 134, . . . , 138. At 406, the extracted entities are grouped for redundancy optimization so that synonymous entities are identified. In an example, techniques such as Regex, fuzzy match, NLP text similarity, etc., are employed for entity grouping. The dynamic taxonomy data structure 150 is updated at 408 with the entities extracted from the digital content 160. The relationship strengths between each of the digital content items received in the input feeds 132, 134, . . . , 138, and the entries extracted therefrom are calculated at 410.

Entries for the digital content items are attached at 412 to the branches of the dynamic taxonomy data structure 150 which include the corresponding topic/subtopics hierarchy of the digital content items, e.g., news articles based on the relationship strengths between the digital content items and the entities included therein. The features for the entities extracted from the digital content 160 are created at 414. The vector representations of the entities are generated at 416 using the extracted entity features. Clusters each with the optimized number of the vector representations are generated at 418. For example, the K-means clustering algorithm and elbow method can be employed to generate the optimal number of clusters. The top X trending entities (wherein X is a natural number and X=1, 2, 3 . . . ) are identified from each of the clusters at 420. For example, entities that occur in the maximum number of digital content items collected in a given period for the particular cluster can be identified as the top trending entities of that cluster. The digital content feeds associated with the refined clusters are retrieved at 422. The digital content feeds are further refined at 424 by the removal from further consideration of digital content items that are not associated with the top X entities, by the addition of historic digital content items, and adding a topic and/or a dynamically generated headline. In an example, historical digital items to be included can be randomly selected from the digital content items associated with the top-trending entities received in prior feeds before a predetermined time, and at 426, user preferences are retrieved from the user data 182 and applied to the digital content feeds generated at 422 to produce the personalized digital content feeds 172, 174, . . . , 178 which are transmitted to the user communication devices.

Figure 5:
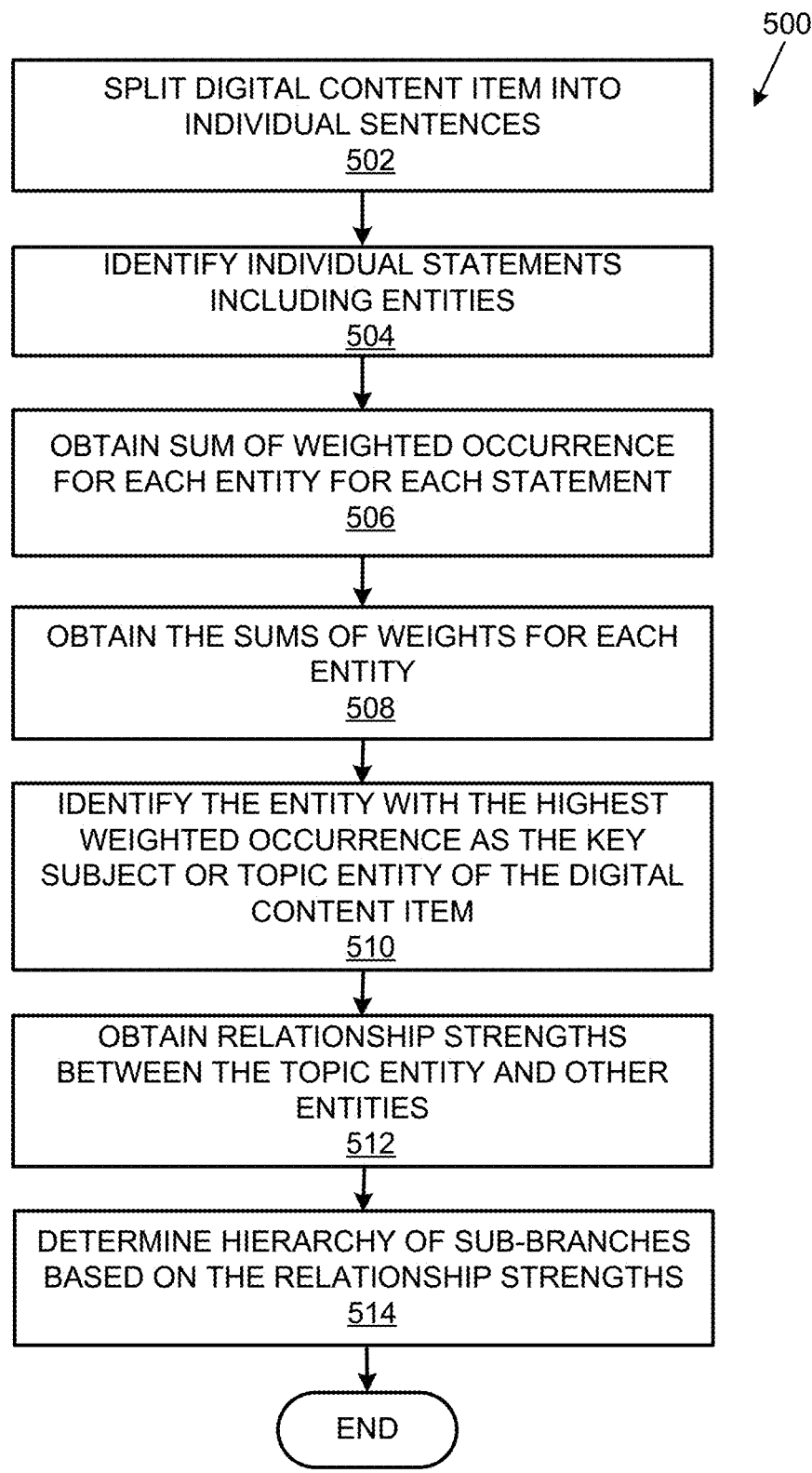
FIG. 5 shows a flowchart that details a method of determining the relationship strength between a digital content item (e.g., a news article) and the entities contained therein.

FIG. 5 shows a flowchart that details a method of determining the relationship strength between a digital content item (e.g., a news article) and the entities contained therein. Upon extracting entities as described above, the article is split at 502 into individual statements. At 504, the individual statements that include either or all the entities are identified using NLP techniques. Indirect references including pronouns referring to the entities (e.g., it, he, they, etc.) are also counted at 504 for individual statement identification. Each entity occurrence is counted at 506 as the sum of weighted occurrence across each statement wherein a weight of 1 associated with each statement including the entities identified at 504 is split across the entities. For example, if a statement includes a single instance or multiple instances of the same entity a weight of 1 can be assigned. If a statement includes single or multiple instances of two different entities, then a weight of 0.5 is assigned to each of the two entities. Similarly, a weight of 0.3 may be assigned to each entity occurring in a statement along with two other entities. The sums of weights associated with each of the entities are obtained at 508. The entity with the highest weighted occurrence is identified at 510 and recorded as the key subject or the topic entity of that digital content news item. The relationship strengths between the topic entity and other entities from the dynamic taxonomy data structure 150 are obtained at 512. Based at least on the relationship strengths, other entities recorded in the dynamic taxonomy data structure 150 can be determined as being related to the topic entity. The relationship strengths can be compared to a predetermined threshold so that other entities with relationship strengths above the predetermined threshold are recorded as being related to the topic entity. Such related entities are identified as sub-topics and the hierarchy of sub-branches under the parent node corresponding to the topic entity is determined at 514 based at least on a descending order or the relationship strengths.

Figure 6:
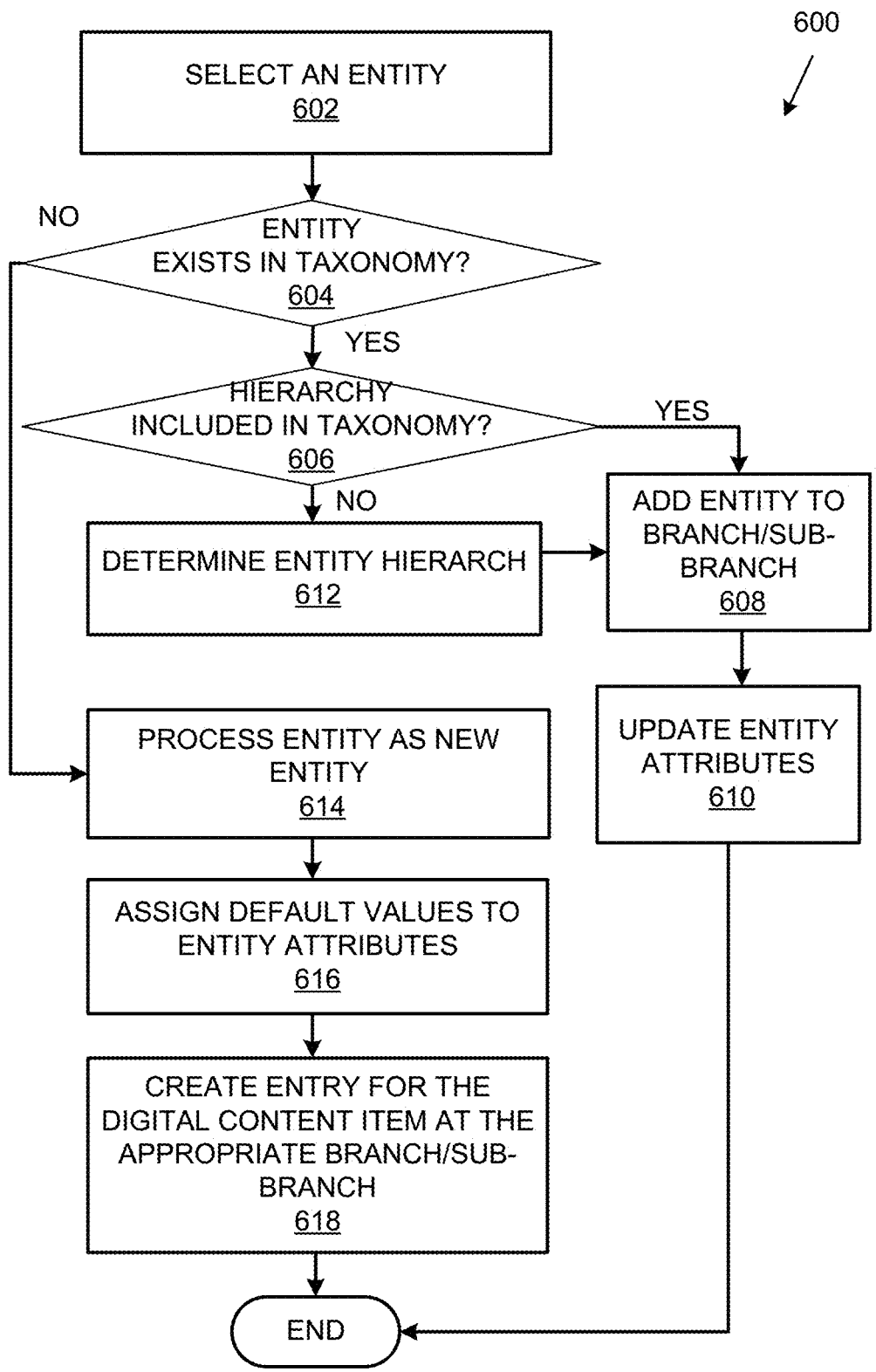
FIG. 6 shows a flowchart that details a method of updating the dynamic taxonomy data structure in accordance with the examples disclosed herein.

FIG. 6 shows a flowchart 600 that details a method of updating the dynamic taxonomy data structure 150 to include a reference to a digital content item or an article in accordance with the examples disclosed herein. An entity is initially selected at 602 for processing. In an example, the entity with the highest weighted occurrence count is selected as the topic entity which is most closely associated with the digital content item. It is determined at 604 if the topic entity already exists in the dynamic taxonomy data structure 150. In an example, if it is determined at 604 that the topic entity is an existing entity, it is further determined at 606 if the hierarchy of the entity is included in the dynamic taxonomy data structure 150. In an example, the entity hierarchy can be based on a listing of sub-topics arranged in a branch in descending order to relationship strengths. In an example, the dynamic taxonomy data structure 150 can include branches of various combinations of the topic entity and sub-topics. If it is determined at 606 that the entity hierarchy (i.e., the topic entity/sub-topic entity) is known, then an entry for the digital content item including the entity is added to the corresponding branch/sub-branch at 608 based on the relationship strength between the entity and the corresponding digital content item. If two or more topic entities or sub-topic entities having equal relationship strengths are identified, then entries for the digital content item can be added to all the branches corresponding to the topic/sub-topic combinations. The entity attributes such as the TTL, the count, and the AFOO are updated for the entity at 610 and the method terminates on the end block. In an example, TTL can be calculated from rules that can be defined manually. By way of illustration and not limitation, a weightage can be defined on an adjustable scale ranging from 0 (low) to 20 (high) based on the AFOO value and TTL can be defined as:

$$TTL=2*(1 \text{ if Low weightage}, 2 \text{ if medium weightage}, 3 \text{ if high weightage}) \text{ days}$$

The TTL is calculated in a way that it addresses both temporal and importance aspect of an entity. For example, a news article may be linked to multiple entities, but the entity having the strongest relationship strength drives the TTL of that news article. The recency aspect is thus addressed in the news domain. Furthermore, the above formula enables implementing upper and lower brackets for the minimum and maximum TTL. TTL may not attain infinite or a very large value. To this end, the maximum and minimum TTLs can be editorially controlled.

If it is determined at 606 that the entity exists in the dynamic taxonomy data structure 150 but the hierarchy for the entity is not known, the entity hierarchy is determined at 612 based on the heuristic relationship strengths between the digital content item and the entities identified therein. Accordingly, an entry for the digital content item can be included in the corresponding branch/sub-branch of the dynamic taxonomy data structure 150 at 608 and the entity attributes are obtained at 610 as described above.

If it is determined at 604 that the entity does not exist within the dynamic taxonomy data structure 150, the entity is processed as a new entity wherein the first identified occurrence entity name is chosen as a topic and added as the top-level parent entity or parent node at 614 as a new branch to the graph in the dynamic taxonomy data structure 150. In an example, different combinations of the new entity as topic/sub-topic i.e., parent node and child nodes under the parent node with other related entities are generated and the corresponding branches are added to the dynamic taxonomy data structure 150. In an example, the related entities can include entities that occur together with the new entity in a single digital content item. The default values are assigned to the attributes TTL, Count, AFOO, etc. at 616. An entry for the digital content item is created at 618 in the new branch at the appropriate hierarchy based on the relationship strength between the digital content item and the new entity and the method terminates on the end block. Thus, each entity that is extracted is processed to determine an appropriate position within the dynamic taxonomy data structure 150 and a corresponding position is determined for an entry corresponding to the digital content item.

Figure 7:
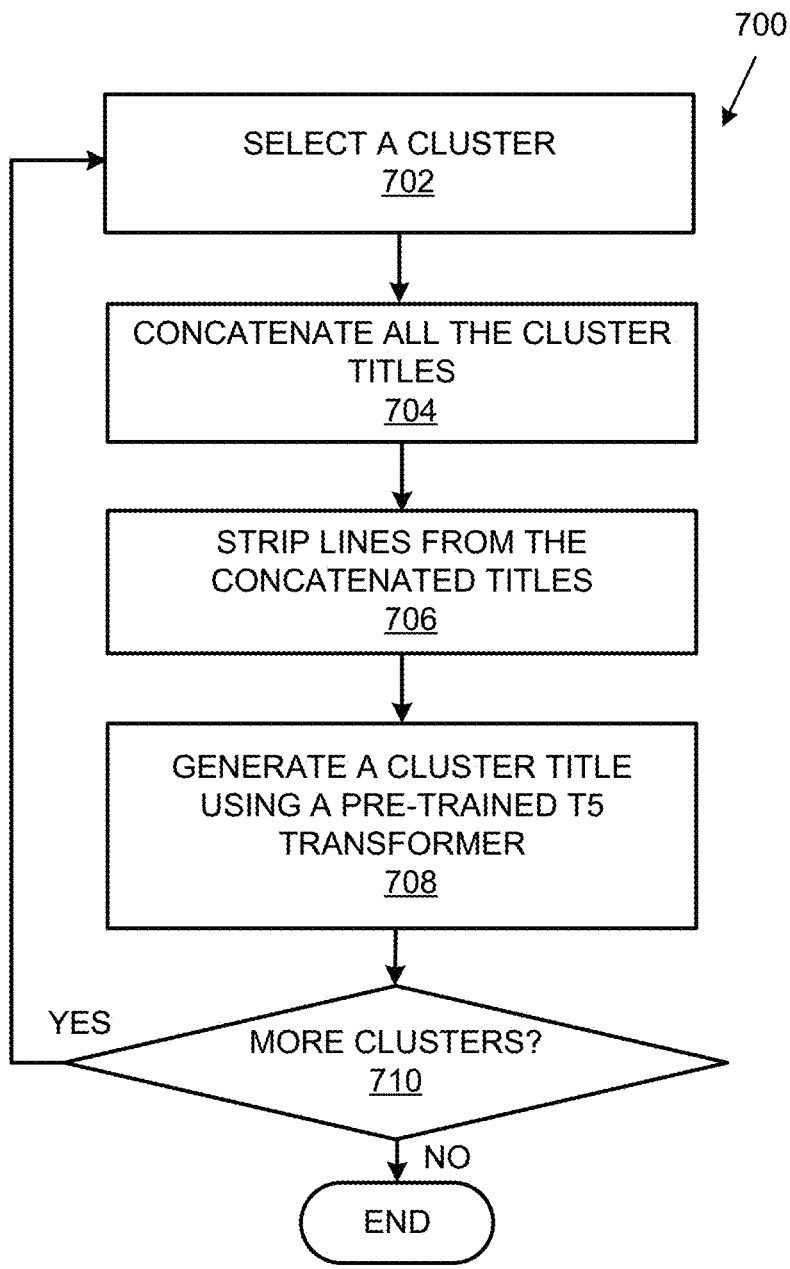
FIG. 7 shows a flowchart that details a method of dynamically generating a headline for each of the clusters in accordance with the examples disclosed herein.

FIG. 7 shows a flowchart that details a method of dynamically generating a headline for each of the clusters in accordance with the examples disclosed herein. The method begins at 702 a cluster is selected and at 704, all the titles of the selected cluster are concatenated. At 706, the lines are stripped from the concatenated titles so that a limited number of characters (e.g., 4000) may be included as a short description for each cluster group. At 708, a T5 Transformer model which may be pre-trained (e.g., on Wikihow) can be employed to further edit or summarize the short description of each cluster's short description to generate a title for that cluster. T5 is an encoder-decoder model pre-trained on a multi-task mixture of unsupervised and supervised tasks and for which each task is converted into a text-to-text format. At 710, it is further determined if more clusters remain to be processed. If yes, the method returns to 702 to select the next cluster, else the method terminates on the end block.

Figure 8:
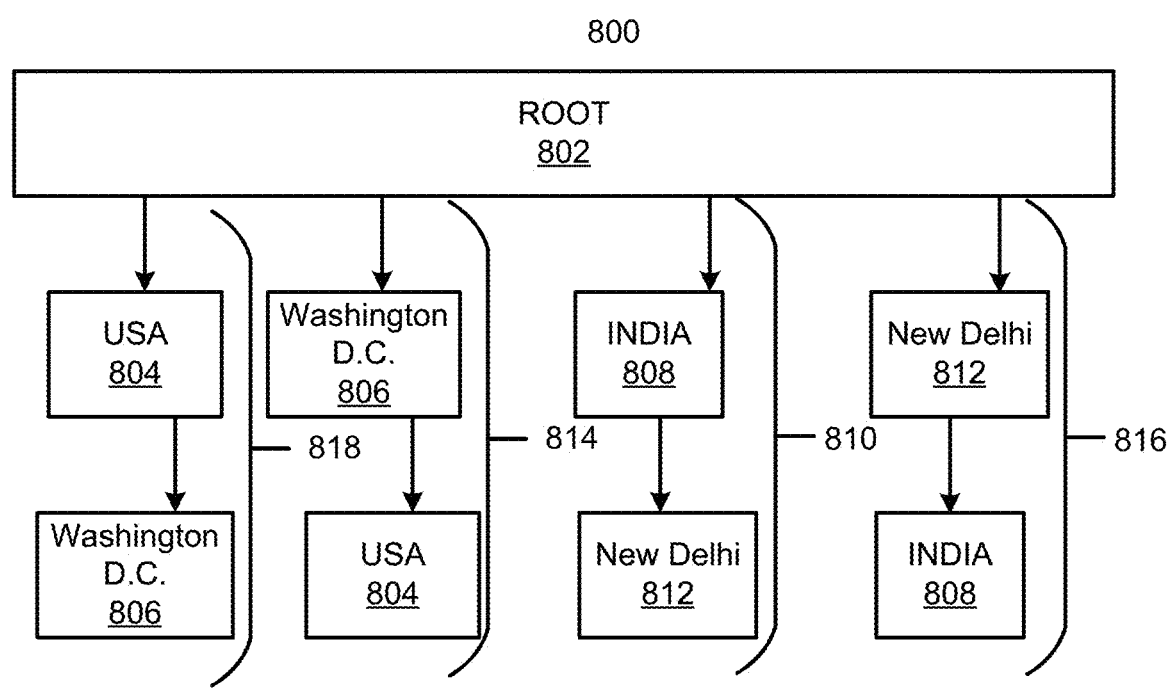
FIG. 8 shows an example dynamic taxonomy data structure generated and used by the digital content feed generator system in accordance with the examples disclosed herein.

FIG. 8 shows an example dynamic taxonomy data structure generated and used by the digital content feed generator system 100 in accordance with the examples disclosed herein. The root 802 node has four branches 810, 814, 816, and 818 formed out of four entities, USA 804, Washington D.C. 806, India 808, and New Delhi 812. Each of the branches is generated from different combinations of two related entities, USA 804, Washington D.C. 806, and India 808, New Delhi 812 which are extracted from the same digital content. Incoming digital content items can be analyzed to identify the main topics and sub-topics to be classified under one of the branches. For example, an article including the entities USA 804 and Washington D.C. 806 can be either classified under branch 818 or 814 depending on the main topic/sub-topic of the article. Similarly, an article including the entities India 808 and New Delhi 812 can be classified under one of the branches 810 and 816 based on the main topic/sub-topic of the article.

Figure 9:
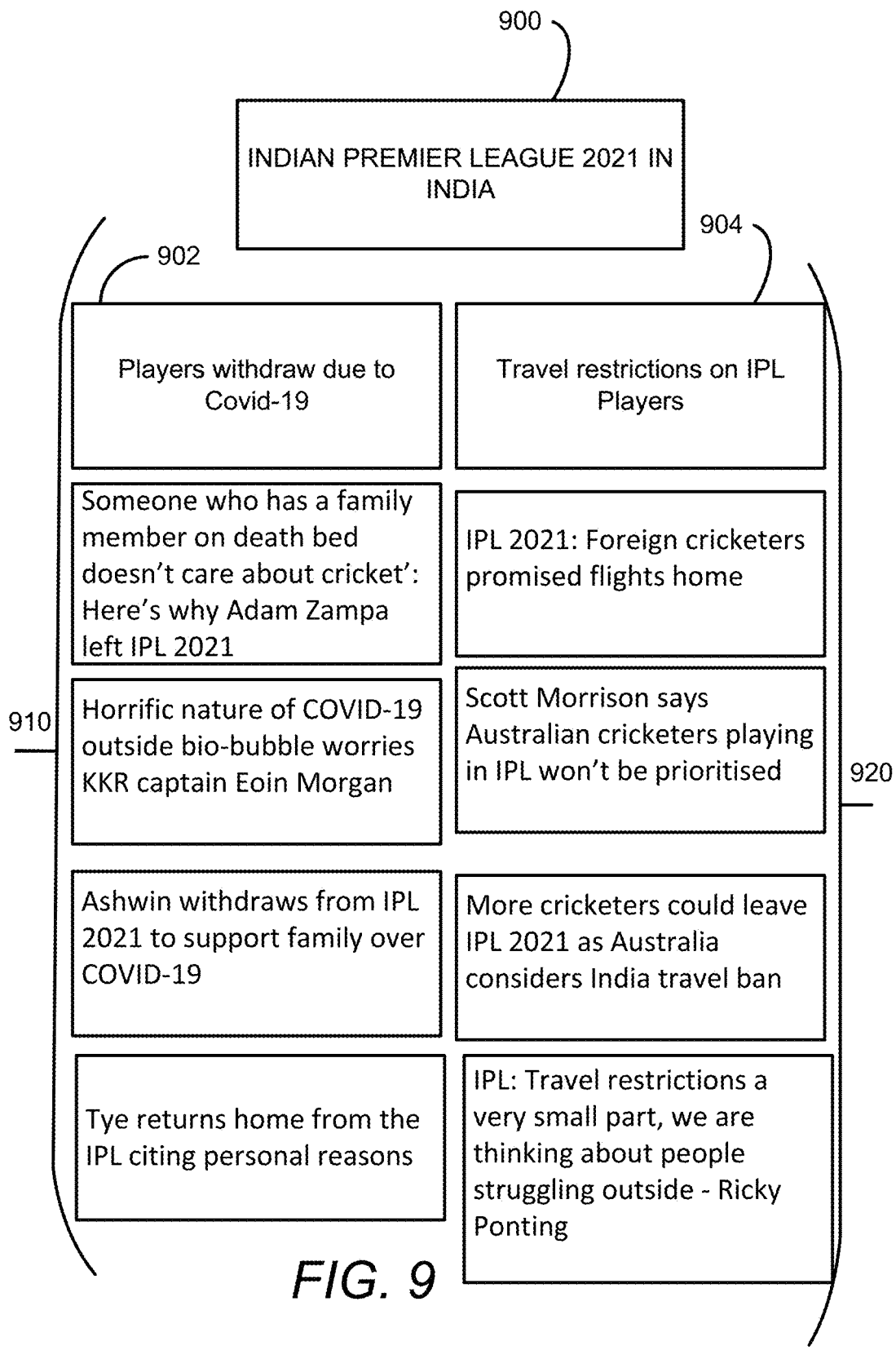
FIG. 9 shows some example news clusters that are generated in accordance with the examples disclosed herein.

FIG. 9 shows some example news clusters 910 and 920 that are generated by the smart feed compiler 106 per the examples disclosed herein. Titles 902 and 904 form the dynamic headlines for a primary topic 900 of 'Indian Premier League 2021 in India'. that are generated for the clusters 910 and 920 respectively. It may be noted though the titles 902 and 904 are related to the same primary topic 900 they convey different types of information. While the title 902 conveys news items regarding players that withdrew from the Indian Premier League (IPL), 2021, due to Covid-19, the tile 904 is followed by news items/clusters 920 conveying information regarding the travel restrictions in place on the IPL players. The digital content feed generator system 100 therefore provides different clusters based on nuanced differences in the content received in the input feeds.

Figure 10:
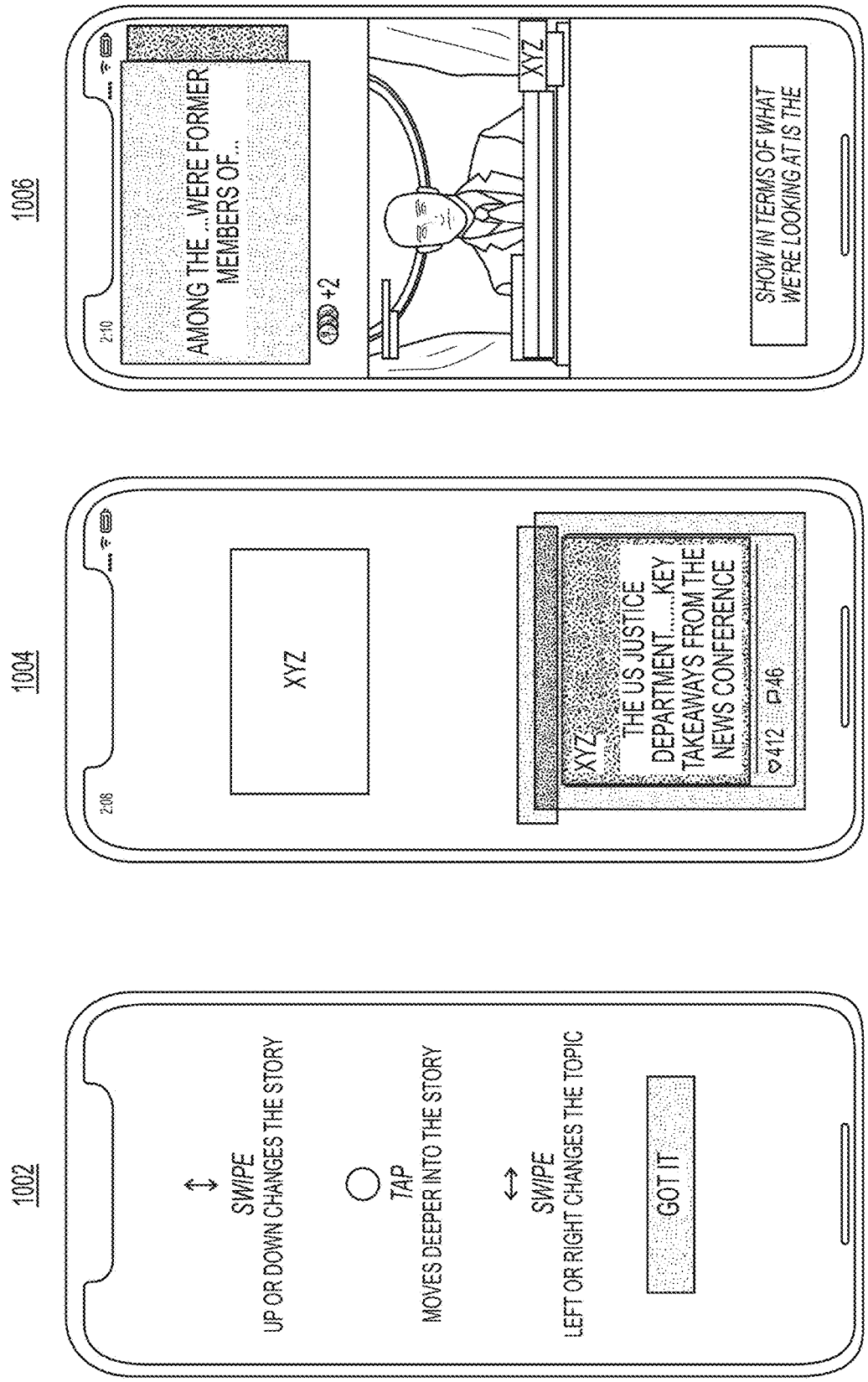
FIG. 10 shows some example user interfaces displayed on user communication devices in accordance with the examples disclosed herein.

FIG. 10 shows some example user interfaces generated by the digital content feed generator system 100 and displayed on the user communication devices 192, 194, . . . , 198, in accordance with the examples disclosed herein. The screen 1002 shows the various gestures used to navigate through the various digital content items transmitted to the user communication device. For example, the up-down swipe gesture enables moving from one item to another in a given personalized digital content stream. The tap gesture enables selecting a specific digital content item to obtain the details. Similarly, the up-down swipe gesture enables navigation through the different topics in the given cluster. The screen 1004 shows a headline/summary summarizing the news article generated in accordance with the methods detailed above. The screen 1006 shows a detailed content item that is displayed when a user taps on a specific digital content item. As mentioned herein, the details can include one or more of textual, audio, and image data.

Figure 11:
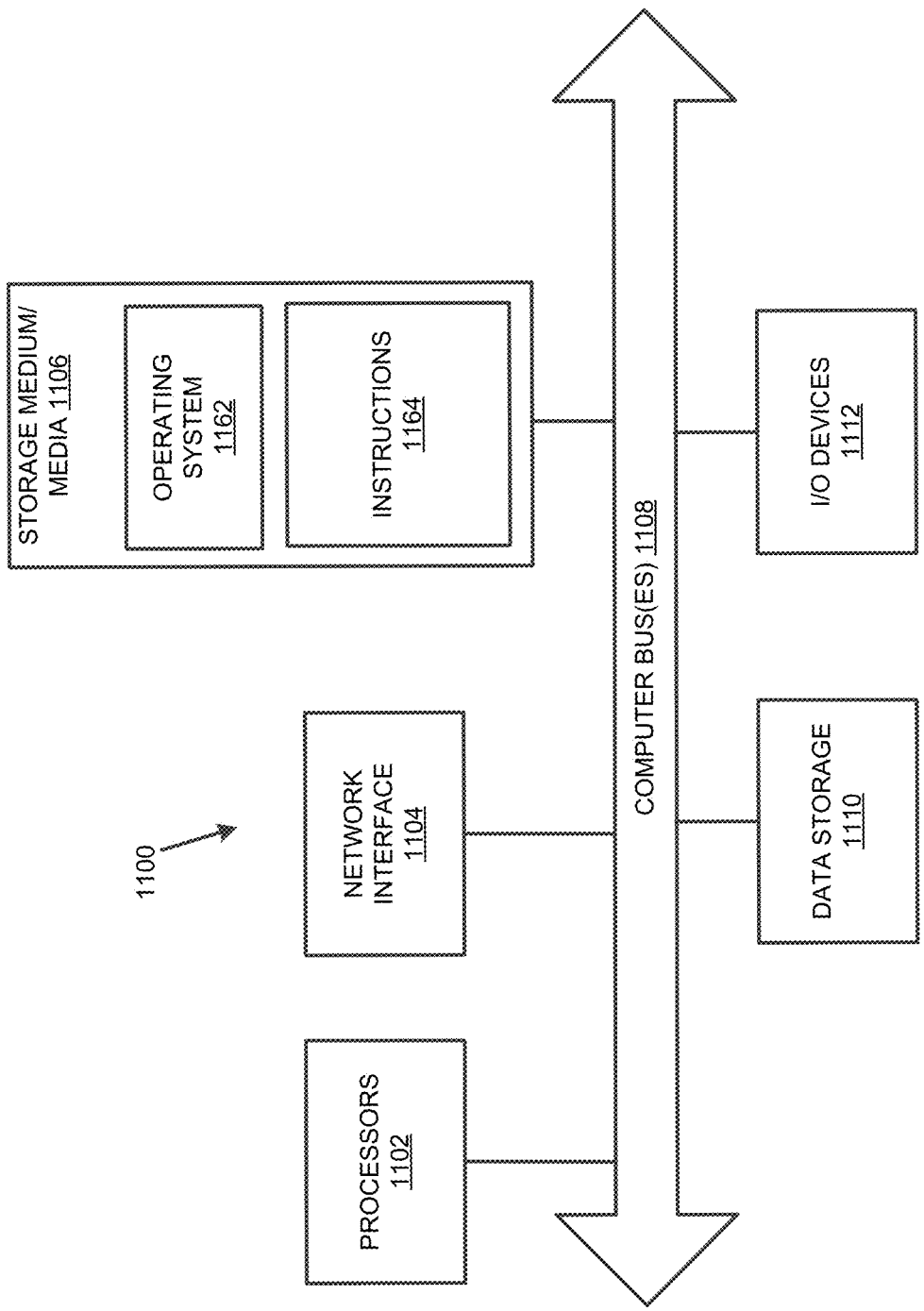
FIG. 11 illustrates a computer system that may be used to implement the digital content feed generator system in accordance with the examples disclosed herein.

FIG. 11 illustrates a computer system 1100 that may be used to implement the digital content feed generator system 100. More particularly, computing machines such as desktops, laptops, smartphones, tablets, and wearables which may be used to generate or access the data from the digital content feed generator system 100 may have the structure of the computer system 1100. The computer system 1100 may include additional components not shown and that some of the process components described may be removed and/or modified. In another example, a computer system 1100 can sit on external-cloud platforms such as Amazon Web Services, AZURE® cloud or internal corporate cloud computing clusters, or organizational computing resources, etc.

The computer system 1100 includes processor(s) 1102, such as a central processing unit, ASIC or another type of processing circuit, input/output devices 1112, such as a display, mouse keyboard, etc., a network interface 1104, such as a Local Area Network (LAN), a wireless 802.11x LAN, a 3G, 4G or 5G mobile WAN or a WiMax WAN, and a processor-readable medium 1106. Each of these components may be operatively coupled to a bus 1108. The computer-readable medium 1106 may be any suitable medium that participates in providing instructions to the processor(s) 1102 for execution. For example, the processor-readable medium 1106 may be a non-transitory or non-volatile medium, such as a magnetic disk or solid-state non-volatile memory, or a volatile medium such as RAM. The instructions or modules stored on the processor-readable medium 1106 may include machine-readable instructions 1164 executed by the processor(s) 1102 that cause the processor(s) 1102 to perform the methods and functions of the digital content feed generator system 100.

The digital content feed generator system 100 may be implemented as software or machine-readable instructions stored on a non-transitory processor-readable medium and executed by one or more processors 1102. For example, the processor-readable medium 1106 may store an operating system 1162, such as MAC OS, MS WINDOWS, UNIX, or LINUX, and code 1164 for the digital content feed generator system 100. The operating system 1162 may be multi-user, multiprocessing, multitasking, multithreading, real-time, and the like. For example, during runtime, the operating system 1162 is running and the code for the digital content feed generator system 100 is executed by the processor(s) 1102.

The computer system 1100 may include a data storage 1110, which may include non-volatile data storage. The data storage 1110 stores any data used by the digital content feed generator system 100. The data storage 1110 may be used to store the digital content 160, the user data 182, the dynamic taxonomy data structure 150, or other data elements, which are generated and/or used during the operation of the digital content feed generator system 100.

The network interface 1104 connects the computer system 1100 to internal systems for example, via a LAN. Also, the network interface 1104 may connect the computer system 1100 to the Internet. For example, the computer system 1100 may connect to web browsers and other external applications and systems via the network interface 1104.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. A digital content feed generator system, comprising:
   at least one processor;
   a non-transitory processor-readable medium storing machine-readable instructions that cause the processor to:
   receive a plurality of input feeds that include digital content items from a plurality of data sources, wherein the digital content items include entities;
   extract the entities from the digital content items received from the plurality of input feeds;
   access a dynamic taxonomy data structure including a hierarchal arrangement of the entities with parent nodes as topic entities and child nodes as sub-topic entities wherein each of the entities is used as a topic entity and a sub-topic entity in different branches of the dynamic taxonomy data structure;
   determine relationship strengths of each of the entities relative to at least one of the digital content items received from the plurality of input feeds;
   identify one of the entities as a topic entity and one or more of the entities other than the topic entity as sub-topic entities for the digital content item based at least on the relationship strengths;
   determine if the topic entity is present in the dynamic taxonomy data structure;
   add an entry for the at least one digital content item under an existing entity or a new entity based on the determination regarding presence of the topic entity in the dynamic taxonomy data structure;
   determine one or more of a count, and an average frequency of occurrence (AFOO) per a predetermined number of hours for the topic entity;
   identify that the topic entity is a trending news item based at least on the AFOO value;
   produce a cluster of multiple ones of the digital content items received from multiple input feeds of the plurality of input feeds,
   wherein the multiple digital content items are similar to the at least one digital content item;
   generate a news feed from the cluster of the multiple digital content items received from the multiple input feeds including the least one digital content item; and
   transmit the news feed to at least one user communication device.

2. The digital content feed generator system of claim 1, wherein to identify the topic entity the processor is to further:
   determine a weighted occurrence count of each of the entities; and
   identify one of the entities with a highest weighted occurrence count as the topic entity.

3. The digital content feed generator system of claim 1, wherein to add the entry under the existing entity for the at least one digital content item the processor is to further:
   determine the count as a number of the digital content items linked to the existing entity in a preceding specific time period.

4. The digital content feed generator system of claim 3, wherein to add the entry under the existing entity for the at least one digital content item the processor is to further:
   determine the AFOO as the count divided by a total number of days since the existing entity was added to the dynamic taxonomy data structure, and a time to live (TTL) indicative of importance of the at least one digital content item is determined as 2 times a weightage.

5. The digital content feed generator system of claim 4, wherein to determine the weightage the processor is to further:
   select the weightage from a scale of values ranging from low weightage to high weightage based on a value of the AFOO.

6. The digital content feed generator system of claim 1, wherein to add the entry for the at least one digital content item the processor is to further:
   analyze each sentence of textual content of the at least one digital content item; and
   obtain various combinations of the entities extracted from the at least one digital content item.

7. The digital content feed generator system of claim 1, wherein to add the entry for the at least one digital content item the processor is to further:
   add the entry for the at least one digital content item under the new entity if it is determined that the topic entity is not already included in the dynamic taxonomy data structure.

8. The digital content feed generator system of claim 7, wherein to add the entry for the at least one digital content item under the new entity the processor is to further:
   create the new entity as a new branch including a combination of the entities as sub-topics in the new branch in the dynamic taxonomy data structure; and
   set values of time to live (TTL), the count, and the AFOO for the new entity to default values.

9. The digital content feed generator system of claim 1, wherein to generate the news feed the processor is to further:
   add a randomly selected historical article relevant to the topic entity to the news feed generated from the cluster of the multiple digital content items.

10. The digital content feed generator system of claim 1, wherein the processor is to further:
    determine a sentiment associated with the at least one digital content item from an add-on entities look-up table.

11. The digital content feed generator system of claim 1, wherein the processor is to further:
    detach entries to stale digital content items from the dynamic taxonomy data structure, wherein the stale digital content items do not include at least top X trending entities from the dynamic taxonomy data structure wherein X is a natural number; and
    discard the entities occurring below a minimum threshold of the AFOO from further consideration.

12. The digital content feed generator system of claim 11, wherein to produce the cluster of digital content items the processor is to further:
    cluster remaining entities using K-means clustering algorithm, wherein a number of the clusters are determined based on an elbow method.

13. The digital content feed generator system of claim 11, wherein to produce the cluster of digital content items the processor is to further:
    identify top trending entities in each of the clusters, wherein the top X trending entities are included in at least a predetermined number of digital content items issued in an immediately preceding, predefined time period.

14. A method of generating digital content feeds, comprising:
    receiving a plurality of input feeds that include digital content items from a plurality of data sources, wherein the digital content items include entities;
    extracting the entities from the digital content items received from the plurality of input feeds;
    accessing a dynamic taxonomy data structure including a hierarchal arrangement of the entities with parent nodes as topic entities and child nodes as sub-topic entities wherein each of the entities is used as a topic entity and a sub-topic entity in different branches of the dynamic taxonomy data structure;
    calculating relationship strengths between the entities and at least one of the digital content items;
    identifying at least one of the entities as a topic entity and one or more of the entities other than the topic entity as sub-topic entities for the at least one digital content item;
    determining if each of the entities is included in the dynamic taxonomy data structure;
    if at least one of the entities is included in the dynamic taxonomy data structure, then:
      adding an entry for the at least one digital content item into the dynamic taxonomy data structure based on a hierarchy as defined by the topic entity and the sub-topic entities;
    if the topic entity is not included in the dynamic taxonomy data structure, then:
      adding the topic entity and as a parent node;
      adding the sub-topic entities as child nodes under the parent node;
      adding an entry for the at least one digital content item into the dynamic taxonomy data structure based on a hierarchy as defined by the topic entity and the one or more sub-topic entities;
    obtaining one or more of a count, and an average frequency of occurrence (AFOO) per a predetermined number of hours for the topic entity;
    identifying that the at least one topic entity is a trending news item based at least on the AFOO value;
    producing a cluster of multiple ones of the digital content items received from multiple input feeds of the plurality of input feeds,
      wherein the multiple digital content items are similar to the at least one digital content item;
    generating a news feed of the cluster of the multiple digital content items from the multiple input feeds including the least one digital content item; and
    transmitting the news feed to at least one user communication device.

15. The method of claim 14, further comprising:
    generating a plurality of personalized news feeds by customizing the news feed based on user preferences of a plurality of users; and
    transmitting the plurality of personalized news feeds to a plurality of user communication devices wherein the at least one user communication device comprises the plurality of user communication devices.

16. The method of claim 15, further comprising:
    reducing value of AFOO for one or more of the entities in the dynamic taxonomy data structure if the at least one digital content item from the one or more data sources does not include the one or more entities; and
    removing stale digital content items from the news feed, wherein the stale digital content items occur in the dynamic taxonomy data structure under the one or more entities having zero value for the AFOO.

17. A non-transitory processor-readable storage medium comprising machine-readable instructions that cause a processor to:
- receive a plurality of input feeds that include digital content items from a plurality of data sources, wherein the digital content items include entities;
- extract the entities from the digital content items received from the plurality of input feeds;
- access a dynamic taxonomy data structure including a hierarchal arrangement of the entities with parent nodes as topic entities and child nodes as sub-topic entities wherein each of the entities is used as a topic entity and a sub-topic entity in different branches of the dynamic taxonomy data structure;
- calculate relationship strengths between the entities and at least one of the digital content items received from the plurality of input feeds;
- identify at least one topic entity and one or more entities other than the topic entity as sub-topic entities for the digital content item based at least on the relationship strengths;
- determine if each of the entities is included in a dynamic taxonomy data structure;
- add an entry for the at least one digital content item to the dynamic taxonomy data structure based on a hierarchy of entities as defined by the at least one topic entity and the one or more sub-topic entities for the at least one digital content item if the at least one topic entity is included in the dynamic taxonomy data structure;
- add at least a parent node corresponding to the at least one topic entity to the dynamic taxonomy data structure and an entry for the at least one digital content item under the parent node based on a hierarchy of entities as defined by the at least one topic entity and the one or more sub-topic entities if the at least one topic entity is not included in the dynamic taxonomy data structure;
- obtain values for attributes including one or more of a count, and an average frequency of occurrence (AFOO) per a predetermined number of hours for the topic entity;
- identify that the at least one topic entity is a trending news item based at least on the AFOO value;
- produce a cluster of multiple ones of the of digital content items received from multiple input feeds of the plurality of input feeds,
  - wherein the multiple digital content items are similar to the at least one digital content item, wherein the plurality of digital content items include the at least one digital content item;
- generate a personalized news feed from the cluster of the multiple digital content items from the plurality of input feeds; and
- transmit the personalized news feed to a user communication devices.

18. The non-transitory processor-readable storage medium of claim 17, wherein the dynamic taxonomy data structure is a knowledge graph.

19. The method of claim 14, further comprising:
- concatenating titles of the multiple digital content items included in the cluster; and
- generating a short description for the cluster by selecting a predetermined number of characters from the concatenated titles.

20. The method of claim 19, further comprising:
- provide the short description as input to a pre-trained T5 transformer model; and
- obtain a title for the cluster as an output from the pre-trained T5 transformer model in response to providing the short description as the input.

* * * * *